US011494661B2

(12) United States Patent
Wu et al.

(10) Patent No.: US 11,494,661 B2
(45) Date of Patent: Nov. 8, 2022

(54) INTELLIGENT TIME-SERIES ANALYTIC ENGINE

(71) Applicant: Accenture Global Solutions Limited, Dublin (IE)

(72) Inventors: Tim Wu, Cerritos, CA (US); Sean Michael O'Connor, Kenmore, WA (US); Takuya Kudo, Kirkland, WA (US)

(73) Assignee: Accenture Global Solutions Limited, Dublin (IE)

( * ) Notice: Subject to any disclaimer, the term of this patent is extended or adjusted under 35 U.S.C. 154(b) by 437 days.

(21) Appl. No.: 16/548,926

(22) Filed: Aug. 23, 2019

(65) Prior Publication Data

US 2021/0056430 A1 Feb. 25, 2021

(51) Int. Cl.
*G06N 3/08* (2006.01)
(52) U.S. Cl.
CPC ................... *G06N 3/088* (2013.01)
(58) Field of Classification Search
CPC ....................................................... G06N 3/08
See application file for complete search history.

(56) References Cited

U.S. PATENT DOCUMENTS

2010/0023307 A1* 1/2010 Lee ...................... G06K 9/6226
703/7

OTHER PUBLICATIONS

Lee et al. ("Time Series Segmentation through Automatic Feature Learning", https://https://arxiv.org/abs/1801.05394, arXiv: 1801.05394v2 [cs.LG], Jan. 26, 2018, pp. 1-13) (Year: 2018).*
Veeresh Elango ("Change Point Detection in Sequential Sensor Data using Recurrent Neural Networks", Masters Thesis, Kth Royal Institute of Technology, School of Electrical Engineering and Computer Science, Stockholm, Sweden, Sep. 20, 2018, pp. 1-59) (Year: 2018).*
Li et al. ("MAD-GAN: Multivariate Anomaly Detection for Time Series Data with Generative Adversarial Networks", https:// https://arxiv.org/abs/1901.04997, arXiv:1901.04997v1 [cs.LG], Jan. 15, 2019, pp. 1-17) (Year: 2019).*

(Continued)

*Primary Examiner* — Luis A Sitiriche
*Assistant Examiner* — Robert Lewis Kulp
(74) *Attorney, Agent, or Firm* — Fish & Richardson P.C.

(57) ABSTRACT

Implementations include receiving two or more time-series data sequences representative of a target process executed within a physical environment, executing automated time-series process segmentation to provide a plurality of subsequence segments for each of the two or more time-series data sequences, each subsequence segment corresponding to a phase of the target process, processing the two or more subsequence segments using at least one time-series transformation to provide a feature data set for each subsequence segment, applying each feature data set to provide time-series models for anomaly detection and forecasting, respectively, each time-series model being provided as one of a recurrent neural network (RNN), a convolution neural network (CNN), and a generative adversarial network (GAN), determining anomaly scores based on the time-series models, and selectively providing an alert to one or more users, each alert indicating at least one anomaly and a respective probability.

24 Claims, 11 Drawing Sheets

(56) References Cited

OTHER PUBLICATIONS

Tootooni et al. ("A Spectral Graph Theoretic Approach for Monitoring Multivariate Time Series Data From Complex Dynamical Processes", IEEE Transactions on Automation Science and Engineering, vol. 15, No. 1, Jan. 2018, pp. 127-144) (Year: 2018).*
Kim et al. ("A Dynamic Additive and Multiplicative Effects Model with Application to the United Nations Voting Behaviors", https://arxiv.org/abs/1803.06711v3, arXiv:1803.06711v3 [stat.AP] Mar. 22, 2018, pp. 1-20) (Year: 2018).*

* cited by examiner

INTELLIGENT TIME-SERIES ANALYTIC ENGINE

BACKGROUND

Industrial process control generally describes the practice of ensuring quality consistency in product manufacturing by monitoring quality metrics and adjusting influential inputs to keep quality metric close to a pre-defined set point. In some cases, this can be a highly manual process, where a human agent monitors product quality and decides how to adjust the process when quality starts to deviate from expectations. There are inherent challenges with a human-centered approach. For example, humans can develop bias over time in troubleshooting and solutioning. As another example, humans can only digest limited information (e.g., single sensor trends and changepoints). As another example, human effort is time- and resource-inefficient.

Machine learning (ML) is the practice of model learning through data relationships. Ideally, this removes user bias and preconceived notions of system dynamics and behavior and enables the data to describe the complex relationships among inputs, or from inputs to outputs. The ability to model industrial process signals for underlying system behavior and relationships enables engineers the ability to estimate expected behavior and to forecast system behavior into the future. In addition, having an expectation of system behavior enables the user to determine when the system is behaving abnormally in a formal manner (e.g., current signal is +/−3 std from historical mean value).

Given the expected exponential growth of Internet of Things (IoT) on the backs of cloud infrastructure and emerging high-bandwidth networks (e.g., 5G networks), the growth of machine and sensor data for industrial processes will require methods and procedures that create scalable end-to-end solutioning to take of advantage of the increasing complexity and scale of information rich data streams. Currently, it is difficult to harness the salient information within overwhelming data streams and machine automation is required to help synthesize data for decision makers.

SUMMARY

Implementations of the present disclosure are generally directed to automated machine learning (auto-ML) in industrial process control applications, such as anomaly detection, time-series forecasting, and feedback control. More particularly, implementations of the present disclosure are directed to an intelligent time-series analytic (ITSA) platform that uses auto-ML to enable resource-efficient anomaly detection and time-series forecasting, and application of reinforcement learning (RL) in industrial process control applications.

In some implementations, actions include receiving two or more time-series data sequences representative of a target process executed within a physical environment, executing automated time-series process segmentation to provide a plurality of subsequence segments for each of the two or more time-series data sequences, each subsequence segment corresponding to a phase of the target process, processing the two or more subsequence segments using at least one time-series transformation to provide a feature data set for each subsequence segment, applying each feature data set to provide time-series models for anomaly detection and forecasting, respectively, each time-series model being provided as one of a recurrent neural network (RNN), a convolution neural network (CNN), and a generative adversarial network (GAN), determining anomaly scores based on the time-series models, and selectively providing an alert to one or more users, each alert indicating at least one anomaly and a respective probability. Other implementations of this aspect include corresponding systems, apparatus, and computer programs, configured to perform the actions of the methods, encoded on computer storage devices.

These and other implementations can each optionally include one or more of the following features: executing automated time-series process segmentation includes processing each of the two or more time-series data sequences using a deep learning (DL) model provided as one of a bidirectional long short-term memory (LSTM) sequence classifier using supervised learning, and an autoencoder using unsupervised learning; the at least one time-series transformation includes one or more of a temporal transformation, a spectral transformation, a shape transformation, a statistical transformation, an autoencoder transformation, and a decomposition transformation, and a pass-through transformation; actions further include processing each feature data set through a reinforcement learning framework, in which rewards are applied based on minimal time deviation from a process set point within the target process; actions further include automatically adjusting a controller based on reinforcement learning to reduce deviation from the process set point; actions further include executing root cause analysis to determine a cause of an anomaly using one or more of classification, correlation, and RL-based action tracking for fault cause inference; the alert includes a cause determined for the at least one anomaly; and the time-series data is generated by one or more Internet-of-Things (IoT) devices located within the physical environment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to automated machine learning (auto-ML) in industrial process control applications, such as anomaly detection, time-series forecasting, and feedback control. More particularly, implementations of the present disclosure are directed to an intelligent time-series analytic (ITSA) platform that uses auto-ML to enable resource-efficient anomaly detection and time-series forecasting, and application of reinforcement learning (RL) in industrial process control and calibration applications. As described in further detail herein, the ITSA platform of the present disclosure automatically generates anomaly detection models and control data models for multivariate time-series in environments generating data (e.g., big data environments). Examples of such environments include, without limitation, Internet-of-Things (IoT)-driven cyber physical systems (CPS) including smart factories, smart grid, connected urban infrastructure, autonomous vehicles and wearable (medical) devices.

Figure 1:
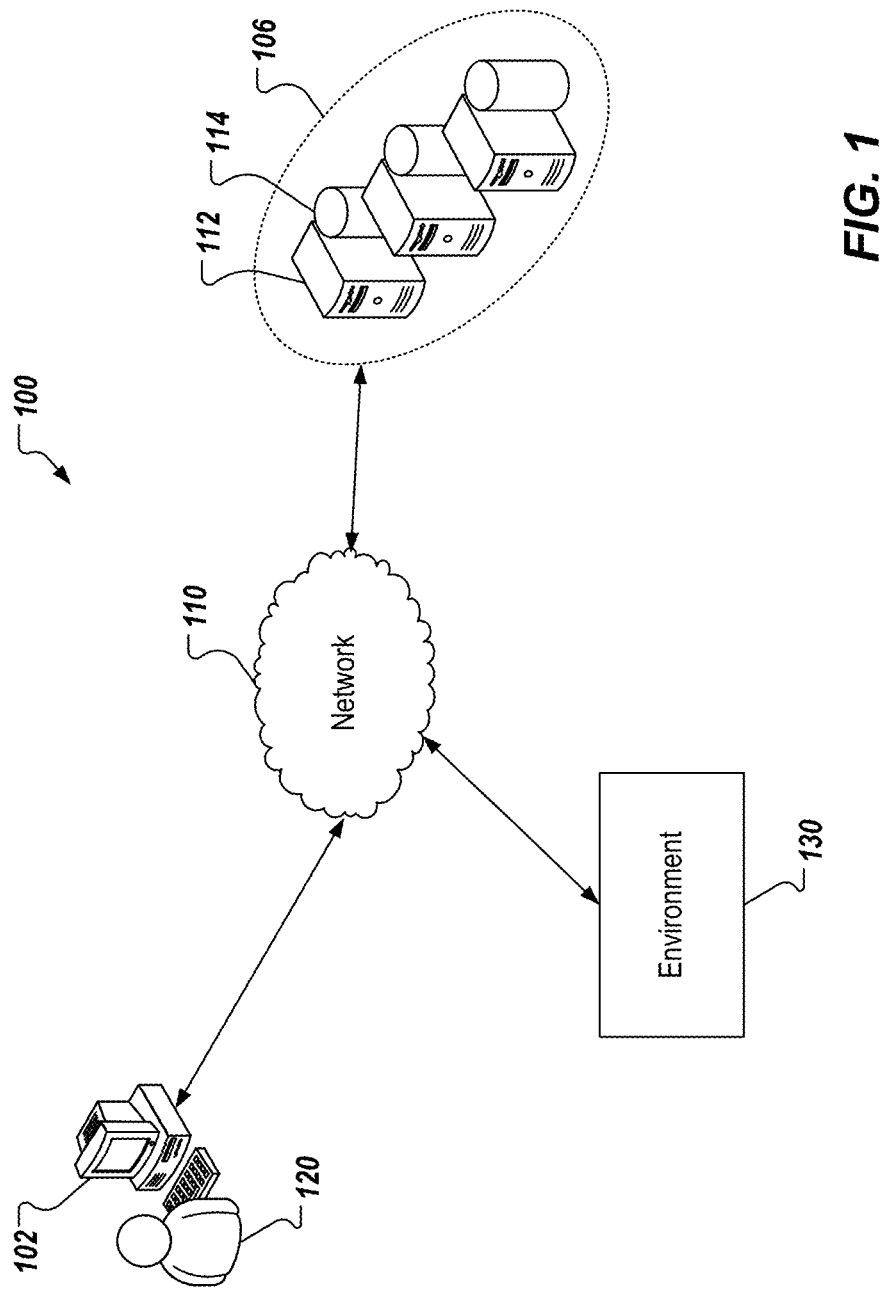
FIG. 1 depicts an example system that can execute implementations of the present disclosure.

FIG. 1 depicts an example system 100 that can execute implementations of the present disclosure. The example system 100 includes a computing device 102, a back-end system 106, and a network 110. In some examples, the network 110 includes a local area network (LAN), wide area network (WAN), the Internet, or a combination thereof, and connects web sites, devices (e.g., the computing device 102), and back-end systems (e.g., the back-end (multi GPU server) system 106). In some examples, the network 110 can be accessed over a wired and/or a wireless communications link. For example, mobile computing devices, such as smartphones can utilize a cellular network to access the network 110.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 106 includes at least one server system 112, and data store 114 (e.g., database). In some examples, at least one server system 112 hosts one or more computer-implemented services that users can interact with using computing devices. For example, the server system 112 of the back-end (multi GPU server) system 106 can host an ITSA platform in accordance with implementations of the present disclosure. In some implementations, the ITSA platform provides anomaly detection, time-series forecasting, RL-based alerting and/or process control for an environment 130. The environment 130 can be representative of any appropriate environment including, without limitation, smart factories (e.g., semiconductor fabrication), smart grid, connected urban infrastructure, autonomous vehicles, and wearable devices.

Figure 2:
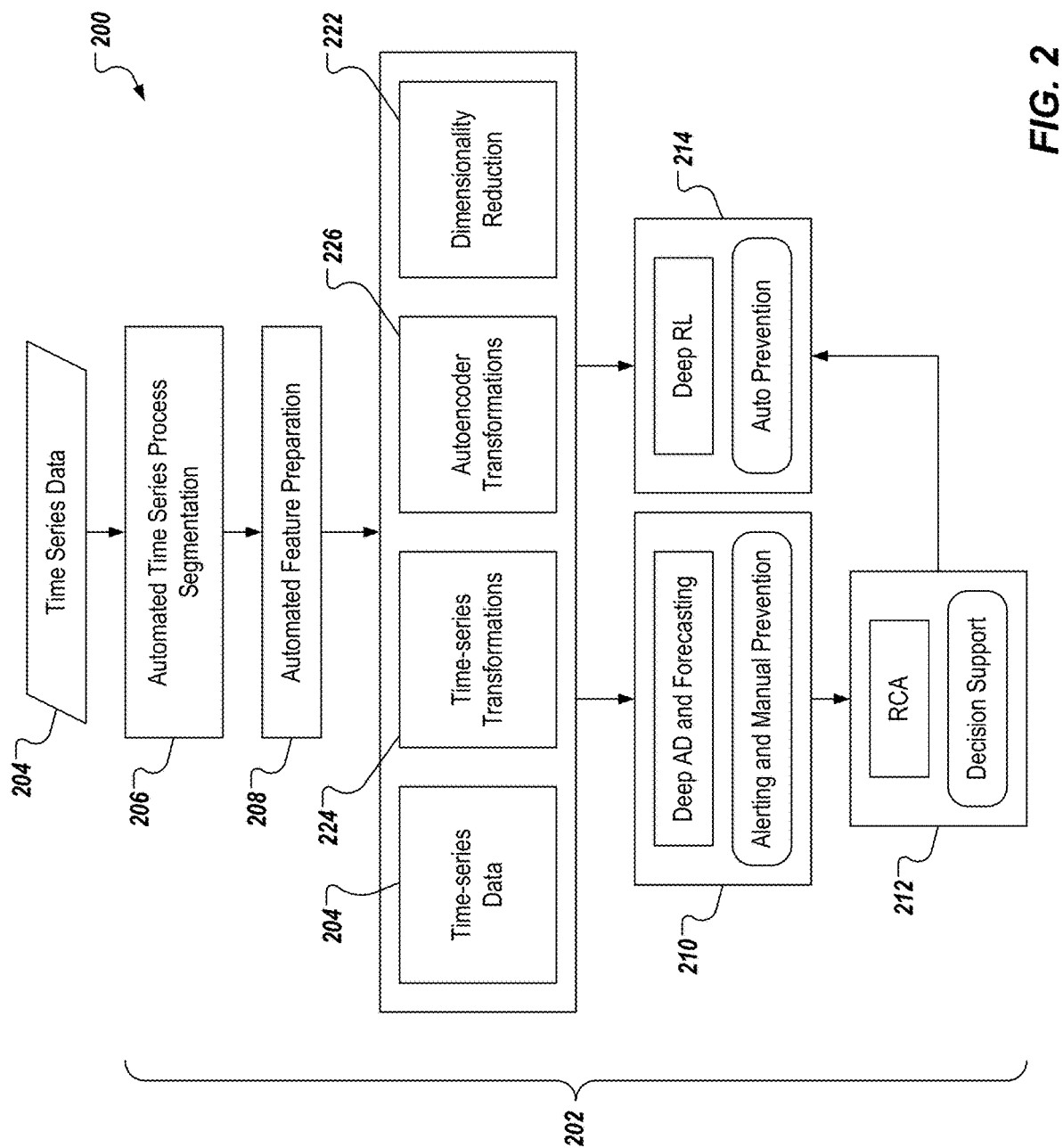
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an ITSA platform 202 that processes time-series data 204 and uses auto-ML to enable resource-efficient anomaly detection and time-series forecasting, and application of RL in industrial process control applications, as described herein. In general, the ITSA platform 202 automates generation of anomaly detection, forecasting, and control data models, as well as techniques for automated root cause analysis (RCA). The ITSA platform 202 can be hosted across one or more computing devices, such as on a cloud computing system, networked computing devices, and/or single computing devices that may have multiple actual and/or virtual computing units (e.g., processors (CPU and/or GPU)), operating systems, process threads, virtual machines). In the example of FIG. 2, the ITSA platform 202 includes an automated time-series process segmentation module 206, an automated feature presentation module 208, a deep anomaly detection (AD) and forecasting module 210, a RCA module 212, and a deep RL module 214. FIGS. 3A-3F provide illustrative examples of different portions of the ITSA platform 202, which are described in-line with the discussion herein.

As described in further detail herein, the ITSA platform 202 generates data models for anomaly detection, forecasting, classification and control from the time-series data 204. In some examples, example formats of the time-series data 204 include, without limitation, multiple process time-series data and multivariate time-series data. In some examples, the time-series data 204 includes a sequence of data points or data records for a data source over time, such as successive measurements taken by a sensor at various intervals over a period of time. Data sources can include any of a variety of appropriate devices, sensors, systems, components, and/or other appropriate systems that are capable of and configured to generate data records, such as time-series data. For example, the time-series data 204 can be generated by IoT devices, such as sensors, components, and devices that are responsive to one or more aspects of their or the surrounding environment's state and to communicate (wired and/or wirelessly) data (e.g., measured values) over the Internet, and/or other communication networks, such as local area networks (LANs), wide area networks (WANs), virtual private networks (VPNs), wireless networks (e.g., Wi-Fi networks, BLUETOOTH networks, mobile data networks), or any appropriate combination thereof.

By way of non-limiting example, the time-series data 204 can be measurements that are taken by semiconductor fabrication machine sensors that take measurements related to the operation and performance of various components of process and metrology tools (e.g., measurements of the lamp power (temperature), gas flow, chamber vacuum/pressure, thin film thickness and/or any other appropriate measurements). Such example time-series data can be used, for example, to generate data models for each process stage of the wafer fabrication process, which can be used to prospectively identify and correct issues with the fabrication process before they occur (e.g., identify indicators that thermal bulbs or sensors are defective prior to wafers fabricating out of specifications) and/or to reactively determine which component(s) of tools caused the malfunction (e.g., which components are causing uneven application of heating).

In some implementations, the automated time-series process segmentation module 206 processes the time-series data 204 to provide subsequence segments from the time-series data 204. In some examples, each subsequence segment corresponds to a respective phase of a process, as described in further detail herein. The subsequence segments can be extracted using explicit classification or unsupervised similarity models. Subsequence segmentation can be performed automatically with or without domain knowledge. Subsequences segmentation addresses modeling of different system processes with a single model. Rather, separating time-series into several subsequence segments that are process consistent (e.g., ramp up phase, heating phase, pressure phase, ramp down phase) enables several models expected to better capture the complete process behavior when used together. Subsequence segmentation of time-series data can include one sequence (i.e., no segmentation) by default, and can be optionally set to a specific number of subsequence segments or unknown number of segments.

In some implementations, dimensionality reduction 222 can be performed on the time-series data 204 to reduce redundant information. For example, time-series data in IoT and machine sensing settings often carry high volume and highly correlated data streams. Reducing the dimensionality of the time-series data 204 can be performed to provide the most salient underlying information. This reduces the storage and computational demands downstream during anomaly detection. In some examples, dimensionality reduction 222 retains the time dimension of the data, but collapses the instance dimension (e.g., machine, sensor, signal). The resulting time-series data can be used in downstream modeling when there are limitations in storage, computing, and results latency. In supervised learning, where labels must correspond to original dimensions, or if the application is not resource constrained, the original time-series sequences can be used.

In some implementations, automated feature preparation module 208 can execute multiple time-series transformations on the subsequence segments to generate a variable matrix that includes the transformed data (e.g., data records transformed into multiple variable spaces by multiple variable transformations). The time-series transformations can include number of different types of statistical and domain specific transformations 224. Example transformations include, without limitation, statistical transformations that can transform the data records into statistical variable spaces, time domain transformations that can transform the data records into time domain variable spaces, frequency domain transformations that can transform the data records into frequency domain variable spaces, and shape domain transformations that can transform the data records into shape domain variable spaces. In some examples, the time-series transformations can also include autoencoder transformations 226 that can transform time domain data into an encoded space. Encodings can be described as compressed representations of the original time-series data, typically resulting in information loss. The level of information lost in compression depends on the complexity of the time-series data as well as the complexity of the autoencoder model.

Multiple different transformations of each type can be performed on the subsequence segments. The ITSA platform 202 can use a large set of variable transformations, which can enable a large collection of variables to be considered when constructing and/or refining a data model from the subsequence segments. This is instead of relying on domain knowledge (e.g., knowledge about fabrication sensors on the relationships between sensor readings and tools conditions) to be used to preselect a subset of these variables that are likely to be relevant for the specific time-series sequences being evaluated. To reduce compute resources, overfitting and improve accuracy, ITSA implements automated methods for feature selection (e.g., filter methods, wrapper methods, embedded methods, etc.)

In some implementations, the deep AD and forecasting module 210 processes data for to provide one or more data models, and to detect anomalies and/or predict behavior. In some examples, the deep AD and forecasting module 210 provides one or more of a recurrent neural network (RNN) (e.g., with long short-term memory (LSTM)), an autoencoder (e.g., with LSTM), and a generative adversarial network (GAN) (e.g., with LSTM) for modeling. In some examples, and as described in further detail herein, the RNN can be used for anomaly detection based on forecasting. In some examples, and as described in further detail herein, the autoencoder and/or the GAN can be used for anomaly detection based on signal reconstruction (e.g., reconstruction of time-series data). In some implementations, and as described in further detail herein, the RCA module 212 performs classification, correlation, and RL-based action tracking for fault cause inference. In some implementations, and as described in further detail herein, the deep RL module 214 includes both human-centric and machine-centric frameworks for process degradation or anomaly control.

In accordance with implementations of the present disclosure, the ITSA platform 202 can be used in any of a variety of different contexts, including situations in which there is no or little domain knowledge. For example, the ITSA platform 202 can be used to generate data models to diagnose problems with industrial machines and to prospectively recommend users take various actions to avoid such problems in the future based on available machine data (e.g., temperature sensor data). In another example, the ITSA platform 202 can be used in the medical wearables industry to generate data models to provide control of embedded devices to optimize patient comfort and battery life based on available health information for users (e.g., vital sign data, tremor magnitude).

As described herein, the ITSA platform 202 is flexible in design and implementation. In some implementations, modules can be used independently or chained together. For example, time-series data 204 can be input directly to the deep AD and forecasting module 210 as raw time-series data 220. In another example, the automated time-series process segmentation module 206 can be bypassed, if only a single process is expected. In terms of module flexibility, for example, the deep AD and forecasting module 208 can implement commercial products for forecasting (e.g., DeepAR) rather than in-house (e.g., RNN with LSTM).

Figure 3A:
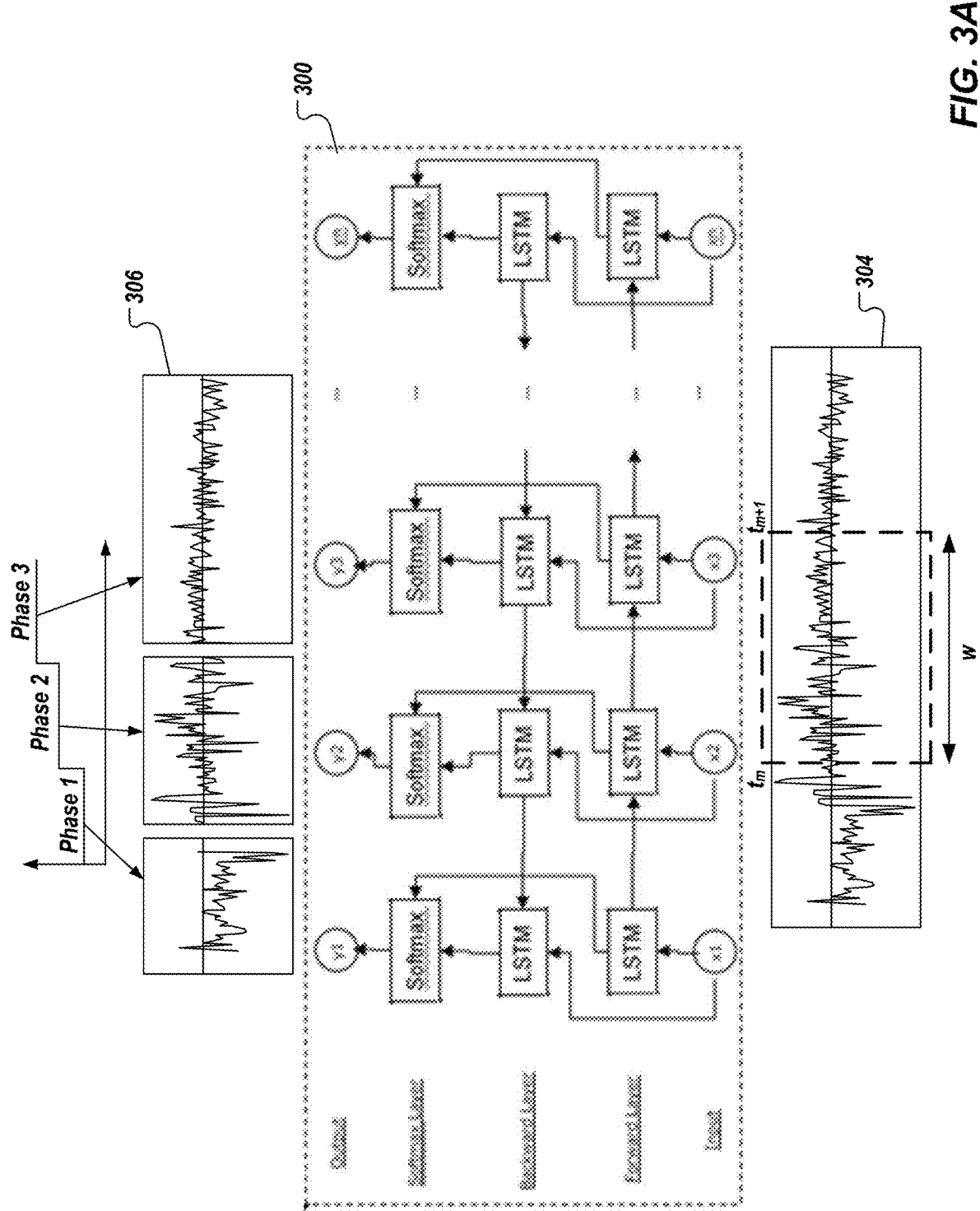
FIGS. 3A and 3B depict an example auto-process segmentation in accordance with implementations of the present disclosure.
Figure 3B:
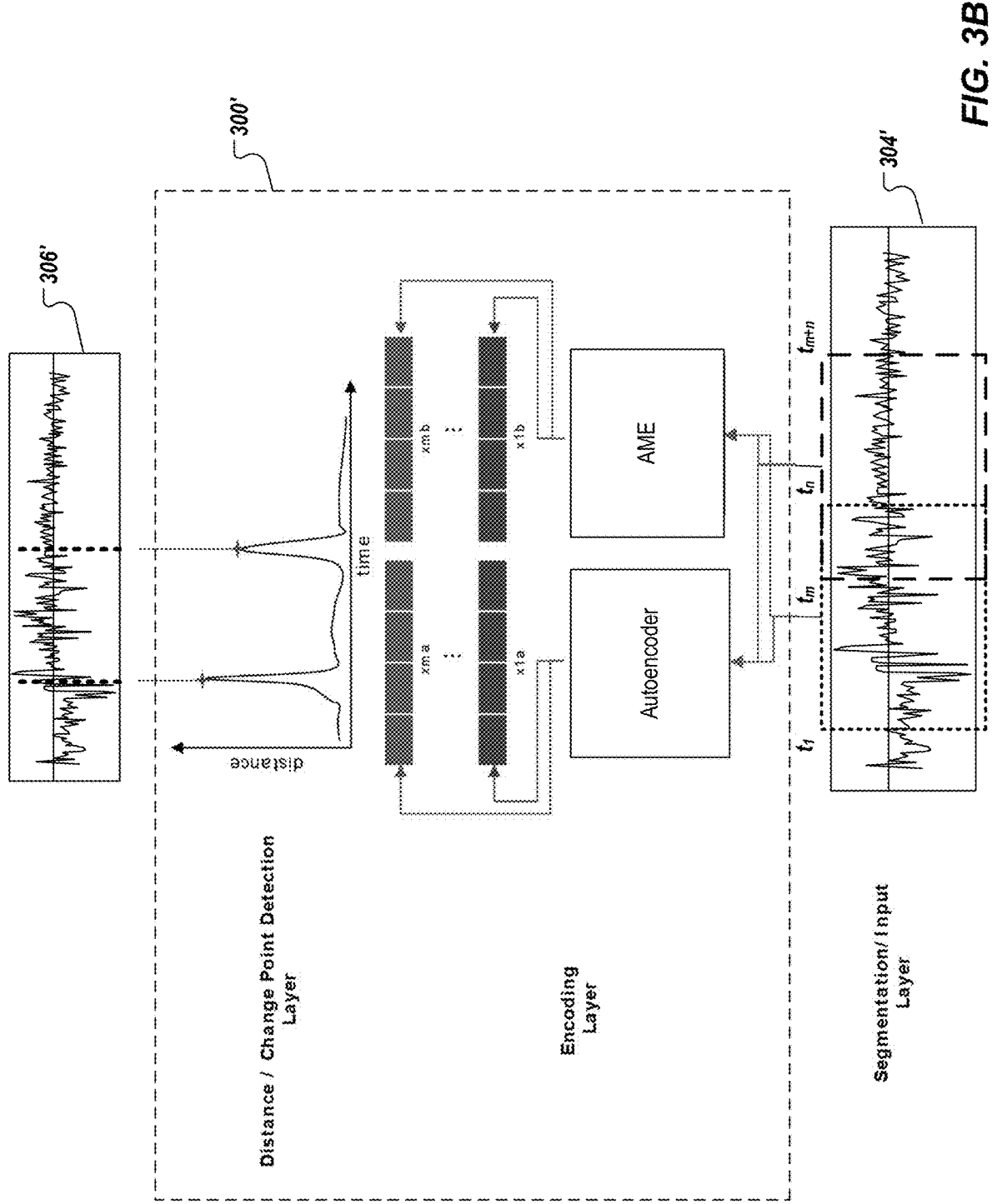

FIGS. 3A and 3B depict example automated process segmentation in accordance with implementations of the present disclosure. With particular reference to FIG. 3A, a deep learning (DL) model 300 (e.g., executed by the automated process segmentation module 206 of FIG. 2) processes time-series data 304 (e.g., (raw) time-series data 204 of FIG. 2) to provide a set of subsequence segments 306 (e.g., the subsequence segments 220 of FIG. 2). In the example of FIG. 3A, the DL model 300 is provided as a bidirectional LSTM sequence classifier that includes an input layer, a forward layer, a backward layer, a softmax layer, and an output layer. In some examples, the DL model 300 is trained using historical data labeled with phase classifications (e.g., supervised training).

In FIG. 3A, the time-series data 304 is depicted as a signal x with a window around time tm to tm+n, capturing sequence records xm to xm+n (n+1 records of x). If multiple synchronized time-series sequences exist for input, each can be added as a second dimension to input x without loss of generality. The set of subsequence segments 306 can be described as an output y for each length n+1 window input and is determined as a probabilistic likelihood that each input timestep belongs to one of the possible output phases (segments). In some examples, a window w slides along the time-series data 304 in predefined increments (e.g., number of timesteps), and data within the window w is processed through the DL model 300 at each increment. Results for y at each increment can be determined by plurality voting. Optionally, results can also be determined by likelihood averaging at each increment and choosing the phase with highest average likelihood. The result has the potential for disjoint phase classes (i.e., phases that stop and start again), especially at phase boundaries, which may require an approach to prevent if unexpected. In some examples, disjoint subsequences are handled by using a k-nearest neighbors (k-NN) approach and can include the constraint that subsequences occur a specified number of times (e.g., each subsequence occurs once), and/or in a certain order.

With particular reference to FIG. 3B, a deep learning (DL) model 300' (e.g., executed by the automated process segmentation module 206 of FIG. 2) processes time-series data 304' (e.g., (raw) time-series data 204 of FIG. 2) to provide a set of subsequence segments 306'. In FIG. 3B, the time-series data 304' is depicted as a signal x with a window around time t1 to tn+1 and a window around tm to tm+n, capturing sequence records xl to xn+1 and xm to xm+n (n+1 records of x). If multiple synchronized time-series sequences exist for input, each can be added as a second dimension to input x without loss of generality. The output yi corresponds to a vector distance measure between input windows starting at xi and xi−1. An encoded vector for each window applied to x is provided as an encoded vector from an autoencoder concatenated with a statistical and domain specific variable transformation. For example, the encoded vector vi includes an encoded vector of x from ti to ti+n as provided from the autoencoder, concatenated with a variable transformation of x from ti to ti+n as provided from an additive and multiplicative effects network (AME). In general, encoding is flexible to include one or many concatenated transformations.

The changepoint detection approach for identifying phases from the time-series data 304', as depicted in FIG. 3B, is unsupervised. This means that phases are classified based on input data similarity without influence from historical labeled output data. The window w slides along the time-series sequence 108 in predefined increments (e.g., number of timesteps). The changepoint detection approach produces one result per increment at most. Like the approach of FIG. 3A, the result has the potential for jitter at phase boundaries and in small spurious data ranges, which may require an approach to prevent if unexpected. Phase jitter or disjoint subsequences are similarly handled using the k-NN approach described above, with the option to add the constraints described above as well.

Figure 3C:
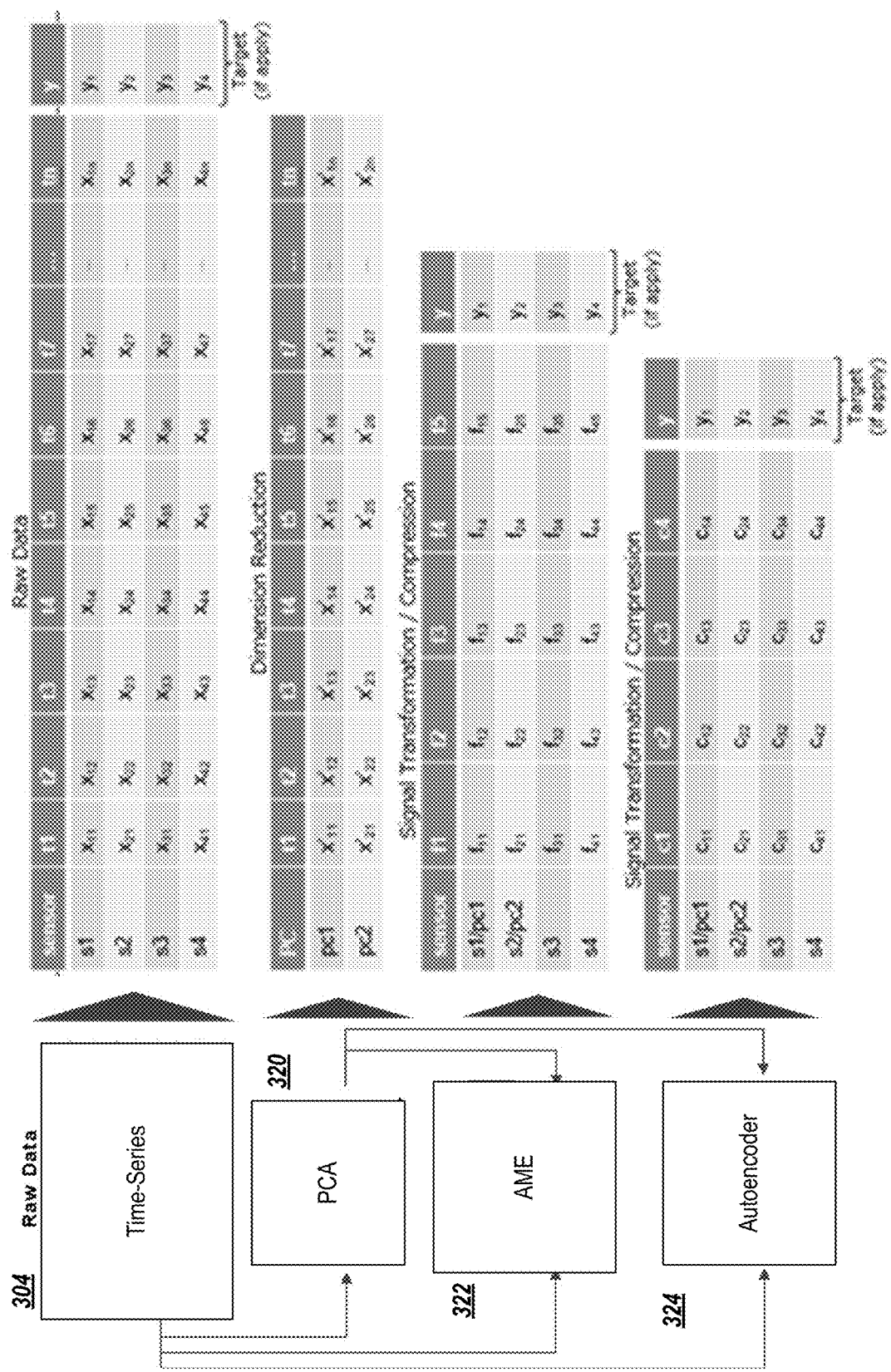
FIG. 3C depicts an example auto-feature preparation in accordance with implementations of the present disclosure.

FIG. 3C depicts an example auto-feature preparation in accordance with implementations of the present disclosure. In the example of FIG. 3C, the time-series data 304 is depicted as raw data, from which subsequent feature preparation steps stem. Dimension altering transformations can occur in both time and instance dimensions, depending on applicability. For example, the time-series data 304 can be a size n collection of time-series sequences from n sensors, each of length m. Collections can be compressed in the instance dimension, n, or the time dimension, m, through linear transform 320 such as ForeCA or PCA, respectively, for example, when the collection is expected to contain significant redundancy and no labels exist. Collections can be transformed from the time domain to a feature domain through statistical and domain-specific variable transformation 322. Collections can be transformed from the time domain to a coefficient domain through autoencoder transformations 324. Labels can be carried over when applicable to the time and instance domain transformations, and transformations can be used independently or chained together when appropriate.

Figure 3D:
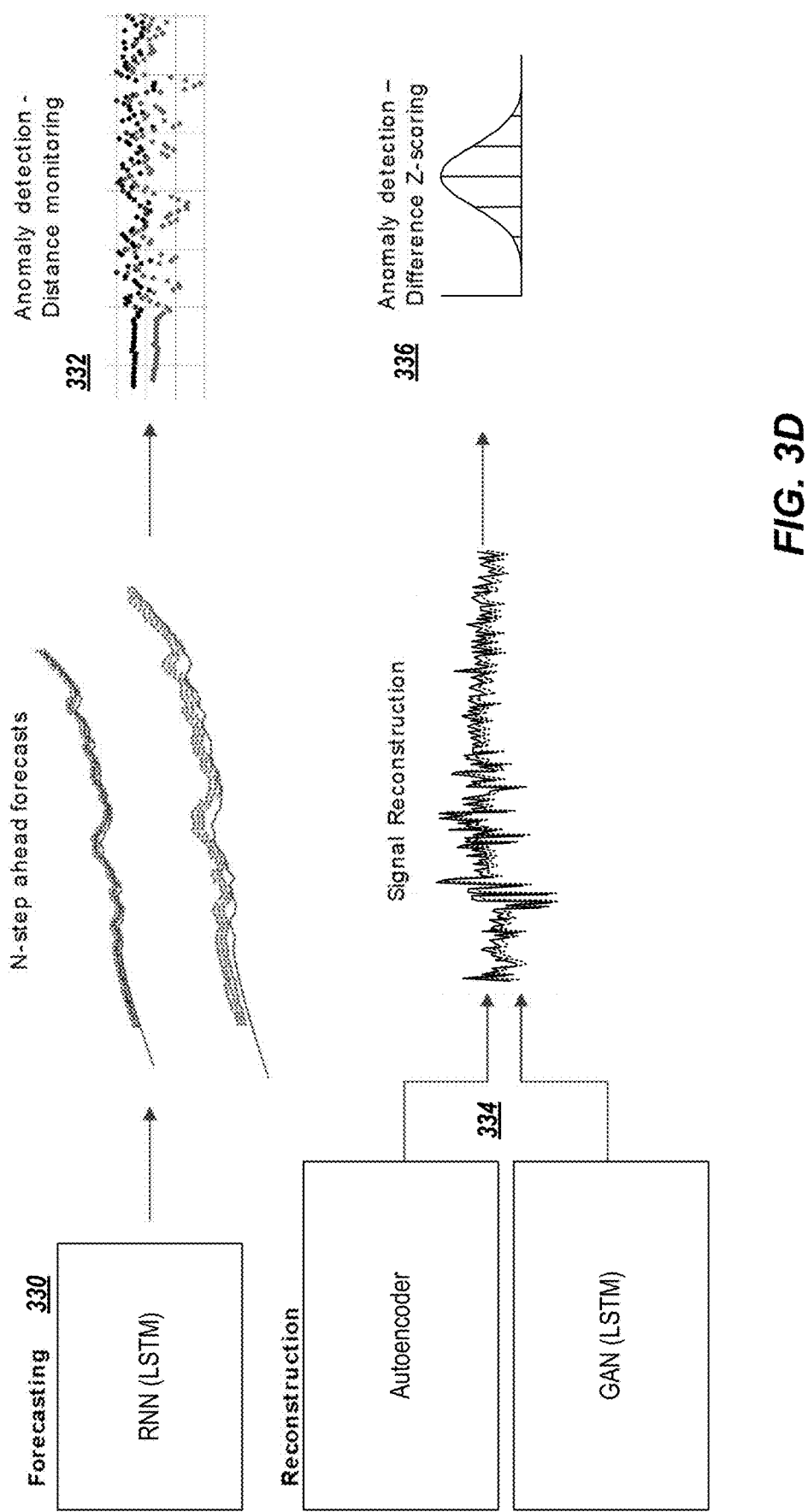
FIG. 3D depicts an example deep anomaly detection and forecasting in accordance with implementations of the present disclosure.

FIG. 3D depicts an example deep anomaly detection and forecasting in accordance with implementations of the present disclosure. In some implementations, one or more of the time-series representations (e.g., 304, 320, 322, 324) or any combination thereof, are used as input for DL models to perform forecasting, estimation, and classification tasks. For example, a RNN (e.g., with LSTM) 330 can be used as a model framework for describing the sequential behavior of time-series. The RNN 330 can be used to predict future time-series data. Subsequently, newly observed time-series data can be compared to forecasted time-series data. Distance based anomaly detection 332 between forecasted and observed data can be used to detect anomalies. As also depicted in FIG. 3D, a reconstruction 334 can be provided using an autoencoder and/or a GAN (e.g., with LSTM) to provide a signal reconstruction that can be used for anomaly detection 336. ITSA incorporates auto-ML functionality where all/many combinations of data preparation, algorithms selection, parameter/hyperparameter selection can be evaluated iteratively or in parallel to empirically determine the best performing system (based on success metrics criteria). In addition, ensemble methods such as stacking, averaging, blending, etc. are optionally available when incremental performance increase is important and time, compute resources allow for more comprehensive analysis.

Figure 3E:
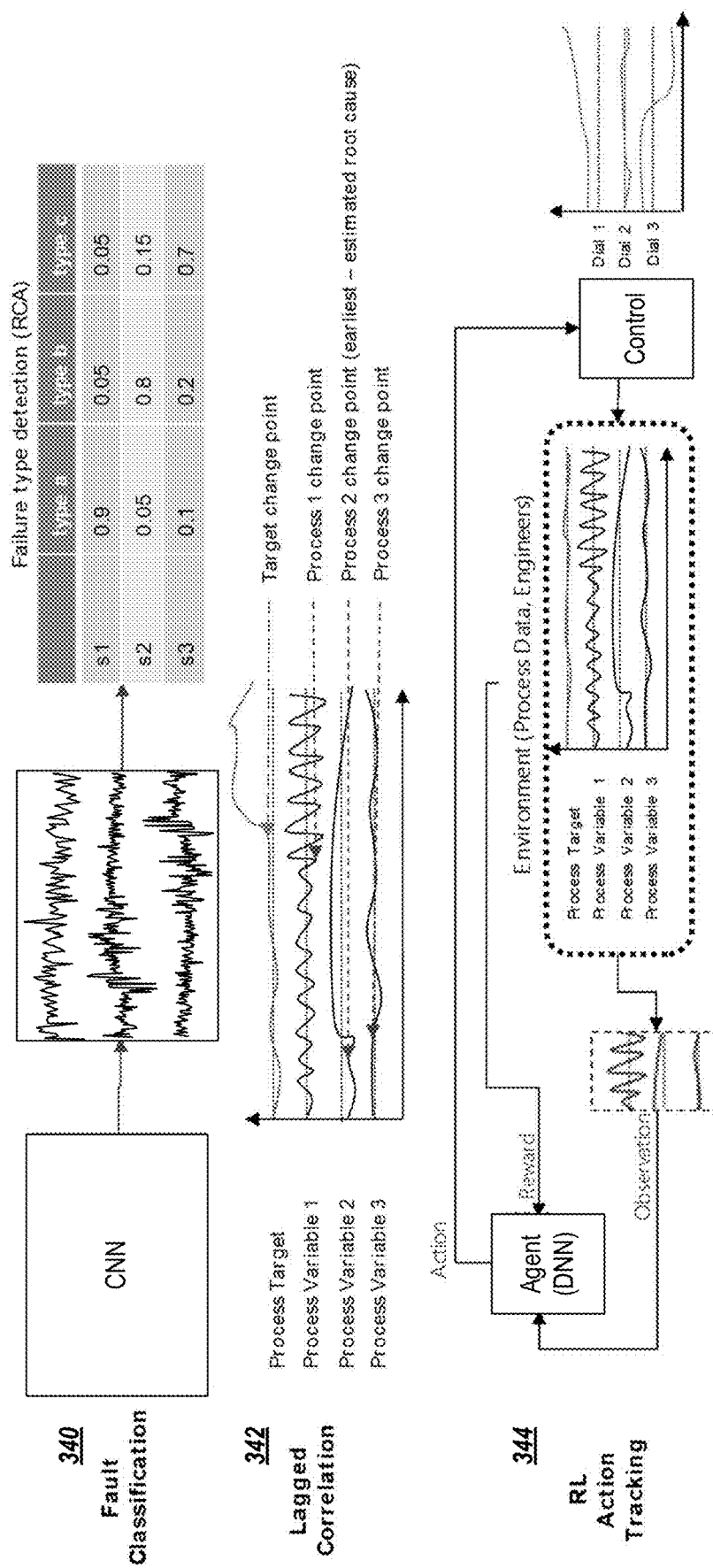
FIG. 3E depicts an example root cause analysis in accordance with implementations of the present disclosure.

FIG. 3E depicts an example RCA in accordance with implementations of the present disclosure. In some implementations, one or more RCA approaches can be used. Example RCA approaches depicted in FIG. 3E include classification 340, lagged correlation 342, and reinforcement learning (RL) action tracking 344.

In some examples, where historical time-series labels are available for specific root causes, a RCA data model can be built and applied in the classification 340 to new time-series data to detect when failure types are probable. In some examples, root cause probabilities are evaluated against a threshold to make declarations of root cause. More particularly, the classification 340 of FIG. 3E can be used when historical time-series labels are available for specific root causes. In the classification approach, one or more time-series data can be input to a CNN, which recreates the one or more time-series data as output (e.g., s1, s2, s3). A probability score can be provided for each of the outputs, and each of one or more types of causes (e.g., type a, type b, type c). The probability scores can be compared to a threshold probability score to identify one or more root causes (e.g., root cause probability>0.9 will flag an alert with the specific root cause).

When historical time-series labels of failure types are not available, one or both of lagged correlation 342, and RL action tracking 344 can be used. Anomaly detection identifies signal time in the target process where abnormal behavior occurs. The target process can be correlated with the feature (input) processes to observe which correlate well with the anomaly, and further to identify the feature that first correlated well with the target anomaly. The inference here is that the earliest occurring correlation corresponds to the root cause of the target process anomaly.

In some implementations, where target process control is implemented using RL or a standard controller, the controller actions can be monitored for deviation (e.g., instead of monitoring the target process signal). If historical data of controller actions with root cause labels exists, the classification approach can be used for new action time-series. If historical data does not exist, anomaly detection can be applied to the action time-series and root cause is inferred by action definitions and subject matter expertise, if available (e.g., trend anomaly detection on thermistor x most likely due to circuit connection degradation).

Figure 3F:
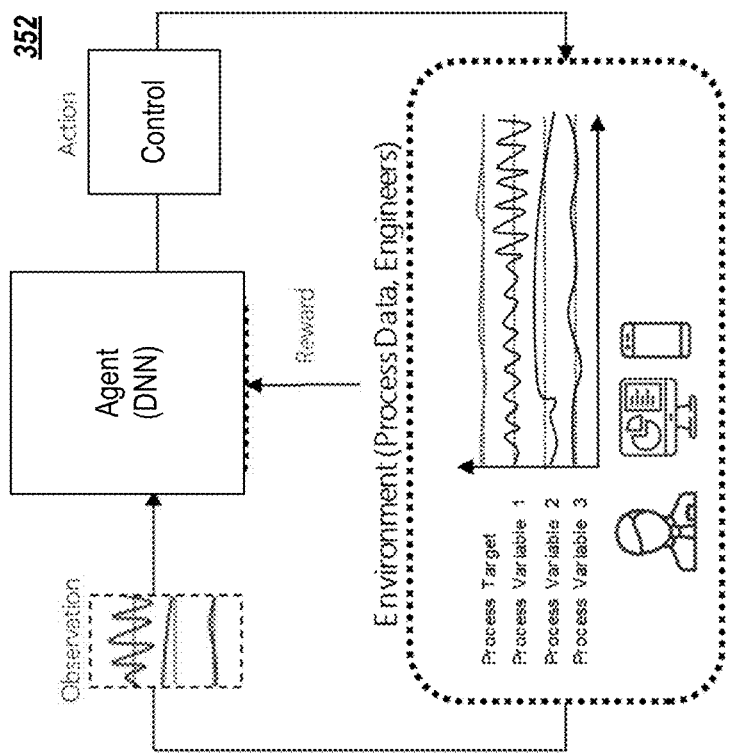
FIG. 3F depicts example deep reinforcement learning in accordance with implementations of the present disclosure.
Figure 3F:
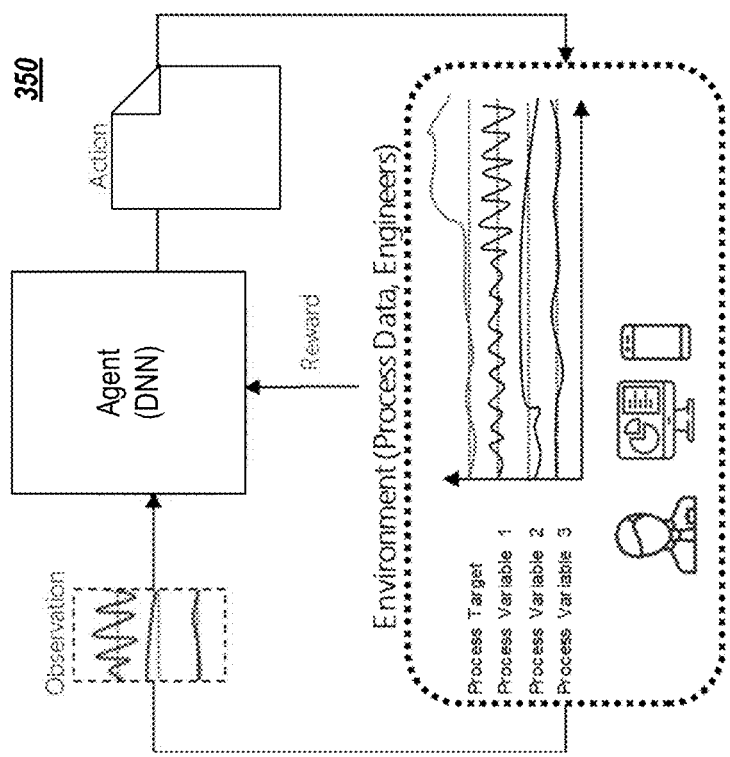

FIG. 3F depicts example deep RL in accordance with implementations of the present disclosure. In some examples, deep RL can be applied in multiple contexts. Example contexts include, without limitation: 1) learning optimal approach to limiting anomalous behavior impact by acting on human interface to correct (depicted as context 350 in FIG. 3F), and 2) learning optimal approach to limiting target process deviation by acting on machine interface to correct (depicted as context 352 in FIG. 3F). In the context 350, the RL model (provided as an agent deep neural network (DNN)) has no control over the target process inputs. That is, the RL model selectively transmits alerts, but does not issue commands to directly (automatically) adjust any control. In the context 352, the RL model has control over some or all of the target process inputs. That is, the RL model selectively transmits one or more control signals to control one or more target process inputs.

Figure 4:
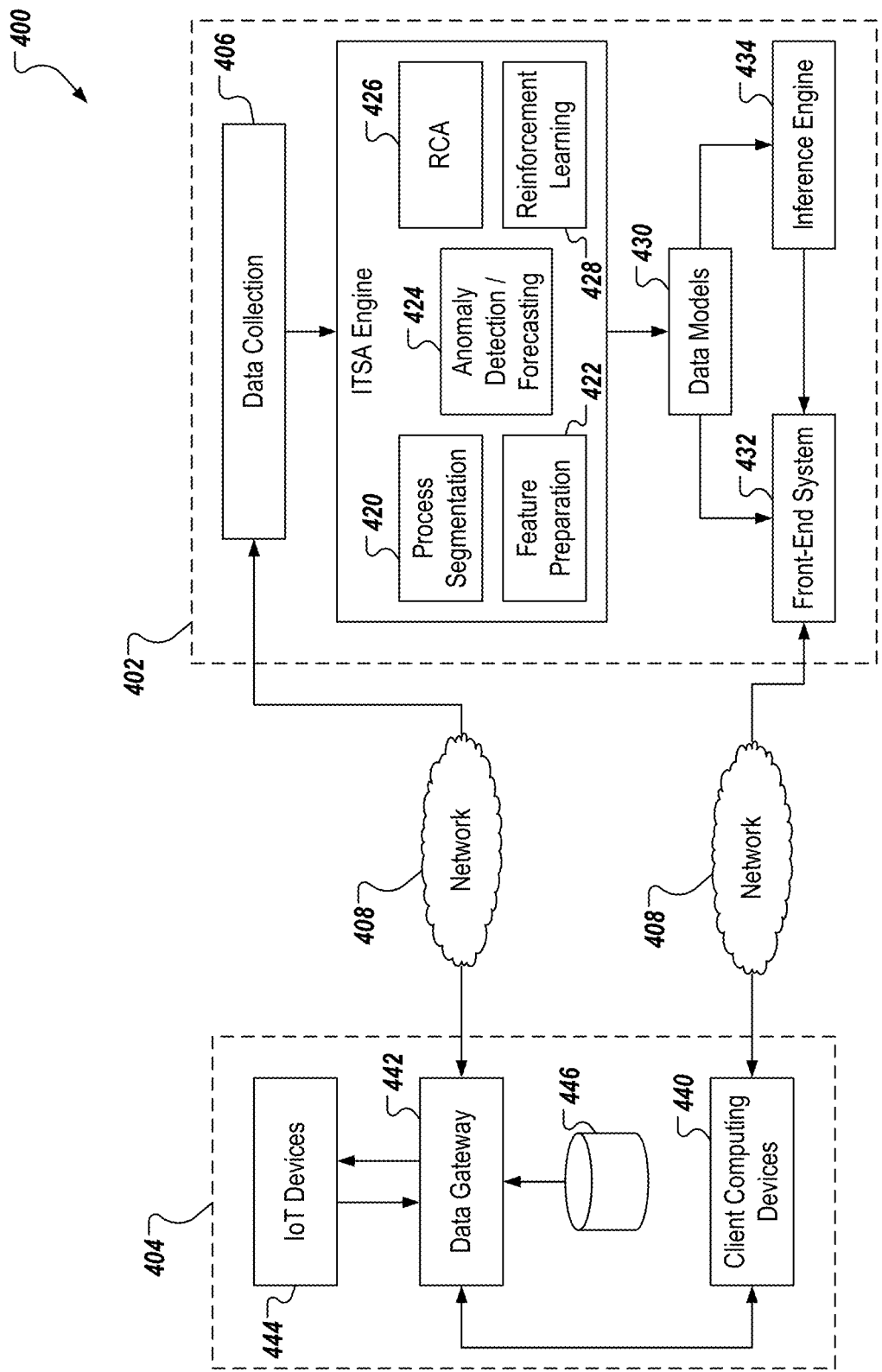
FIG. 4 depicts an example architecture in accordance with implementations of the present disclosure.

FIG. 4 depicts an example system 400 in accordance with implementations of the present disclosure. The example system 400 includes an ITSA platform for generating data models from data generated by one or more data sources, as described in detail herein. As depicted in FIG. 4, the example system 400 includes a computing system 402 and an on-premise system 404.

In some examples, the computing system 402 is programmed to receive data (e.g., time-series data) from various data sources (e.g., IoT devices), generate data models, and provide user-accessible features that use the generated data models (e.g., providing diagnostic services to user queries regarding various problems). The computing system 402 can include one or more computing devices (e.g., servers, personal computing devices). For example, the computing system 402 can be a cloud computing system that uses a networked collection of computing devices that enable computational units, which may be virtual computing devices that are operating across the collection of computing devices, to be deployed and scaled as needed. Other configurations are also possible, such as an on-premise computing system with GPU-acceleration to handle deep learning in a time- and resource-efficient manner.

The computing system 402 includes a data collection subsystem 406 that is programmed to obtain and collect data from data sources that are external to the computing system 402, as described herein. For example, the data collection subsystem 406 can receive data from IoT devices that transmit data over one or more networks 408 (e.g., the Internet and/or other networks). The data collection subsystem 406 can accept data as batch data and/or stream data to receive data in real-time (or near real-time), such as real-time sensor data.

The computing system 402 includes an intelligent time-series analytics engine (ITSAE) 410 that is programmed to receive data obtained by the data collection subsystem 406. For example, the ITSAE 410 includes a process segmentation module 420, a feature preparation module 422, an anomaly detection and forecasting module 424, a RCA module, and a RL module 428. In some examples, the process segmentation module 420 executes supervised bidirectional LSTM and unsupervised autoencoder approaches, as described herein. In some examples, the feature preparation module 106 executes raw data (pass through), AME (temporal, statistical, shape, and spectral), autoencoder and/or PCA transformations, as described herein. In some examples, the anomaly detection and forecasting module 424 implement the RNN (LSTM), the autoencoder (LSTM), and/or the GAN (LSTM) frameworks for modeling, as described herein. In some examples, the RCA module 426 performs classification, correlation and/or RL-based action tracking approaches for cause inference, as described herein. In some examples, the RL module 428 provides human-centric and machine-centric frameworks (e.g., the context 350 and the context 352 of FIG. 3F, respectively) for process degradation or anomaly control.

In accordance with implementations of the present disclosure, the ITSAE 410 provides one or more data models 430 that can be used by a front-end system 432 and/or an inference engine 434. In some implementations, and as described herein, the ITSAE 410 is flexible in design and implementation. In some examples, modules can be used independently or chained together. For example, raw time-series data can be input directly to the anomaly and forecasting module 424. In another example, automated time-series process segmentation provided by the process segmentation module 420 can be bypassed (e.g., only a single process is expected).

In some implementations, the inference engine 434 can receive data from the data collection subsystem 406 and/or from the frontend system 432. In some examples, the data is data, to which the one or more data models 430 are being applied. In some examples, users can submit queries through the front-end system 432, which queries are analyzed by the inference engine 434. In some examples, the inference engine 434 may run a background process that continuously evaluates data that is received through the data collection subsystem 406 and can provide an alert to one or more appropriate entities (e.g., devices, user accounts) regarding the problem and inferred solution (e.g., when an issue is identified that needs to be addressed).

In some examples, the inference engine 434 can process specific queries that are received through the front-end system 432 on a demand basis (e.g., as queries are received from users). For example, the front-end system 432 can include a query engine that is programmed to receive queries, process queries (e.g., textual analysis of queries, interaction with the inference engine 434), and to provide results. For example, a client computing device 440 of the on-premise system 404 can be used by users to submit the queries over one or more networks 408 (e.g., the internet, LANs, WANs, wireless networks, VPNs, combinations thereof).

With regard to the on-premise system 404, the client computing devices 440 can be any of a variety of appropriate computing devices, such as laptops, desktop computers, mobile computing devices (e.g., smartphones, tablet computing devices, wearable computing devices), embedded computing devices (e.g., diagnostic devices), and/or other appropriate computing devices. The client computing devices 440 can receive data, similar to the data that is provided to the data collection subsystem 406, through a data gateway 442 through which the data can be routed to appropriate ones of the client computing devices 440 and/or to the data collection subsystem 406. The data can be generated by various data sources, such as IoT devices 444 including sensors and machine data time-series. The data gateway 442 can also allow for information stored in a database 446, such as historical sensor or machine data that may be stored and distributed in batches, to be communicated to the data collection subsystem 406 and/or the client computing devices 440. The database 446 can also include external time-series data such as local weather. The data gateway 442 can communicate with the data collection subsystem 406 over the network 408.

Figure 5:
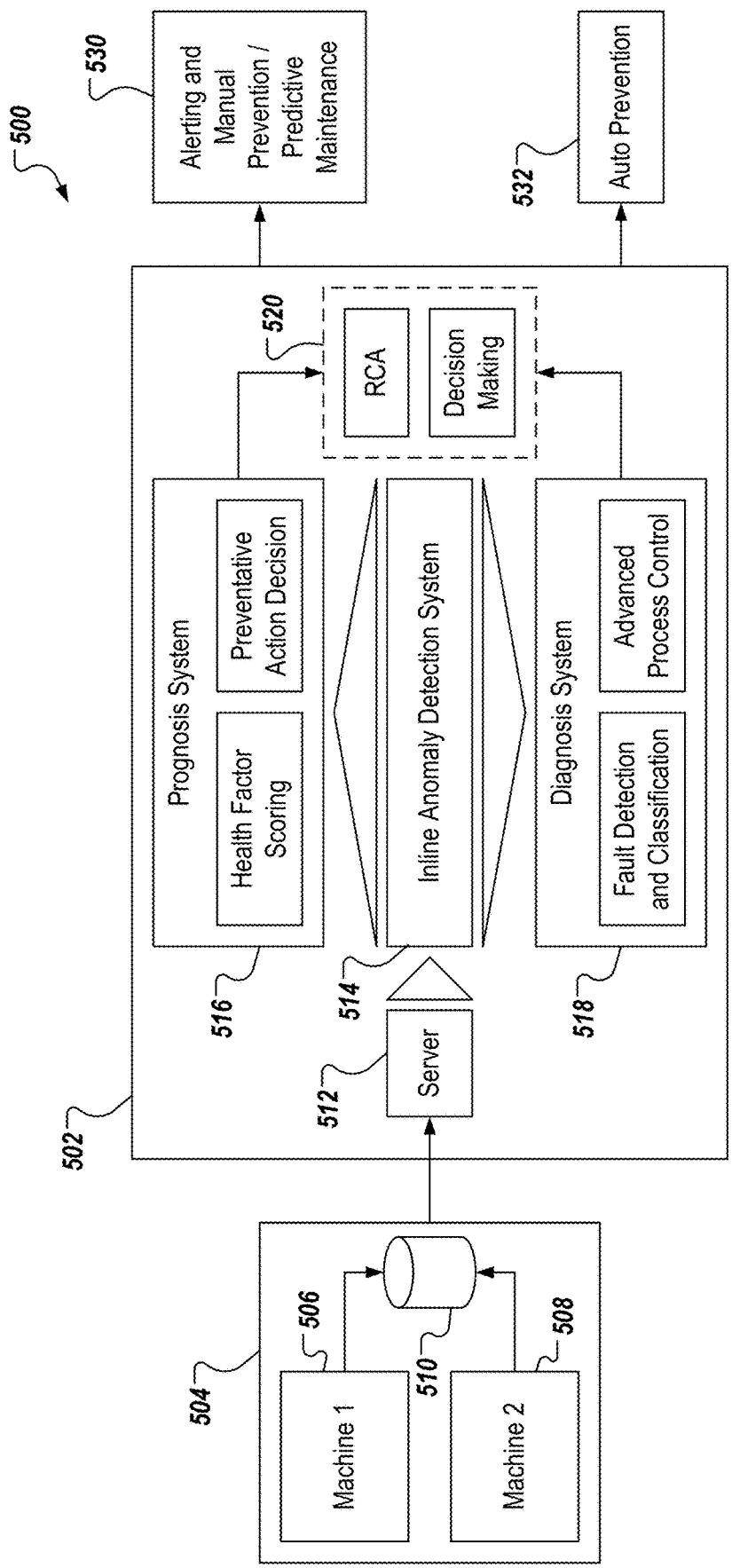
FIG. 5 depicts an example use case in accordance with implementations of the present disclosure.

FIG. 5 depicts an example use case 500 in accordance with implementations of the present disclosure. The example use case 500 includes an example system 502 for generating and using data models to address industrial process control in an example environment 504. By way of non-limiting example, the example environment 504 can be a semiconductor wafer fabrication environment. It is contemplated, however, that implementations of the present disclosure can be realized with any appropriate environment.

In some examples, the example environment 504 includes machines 506, 508 (e.g., fabrication machine, metrology machine), each of which includes one or more sensors (e.g., IoT sensors). In some examples, the sensors are responsive to the respective machines 506, 508 and/or environment around the machines to generate time-series data (e.g., IoT data). In some examples, the data is stored in a database 510. In some examples, the is transmitted over a network interface (either local network or internet for cloud computing) to the example system 502. It is contemplated that each of the machines 506, 508 can include multiple different data sources (e.g., sensors, monitoring devices) that each provide time-series data.

In the example of FIG. 5, the example system 502 includes a server 512, an inline anomaly detection (IAD) system 514, a prognosis system 516, a diagnosis system 518 and an actions system 520. As described herein, the example system 502 receives input from the example environment 504 and provides output to one or more of an alerting and manual prevention/predictive maintenance system 530 and an auto-prevention system 532.

In some examples, the server 512 receives the data and distributes the data to the IAD system 514. In some examples, the IAD system 514 generates data models based on the data from the machines 506, 508 and can provide the data models to the analytics systems 530, 532.

In some examples, the IAD system 514 relays at least a portion of the data to the prognosis system 516. In some examples, the prognosis system 516 processes the data for forecasting and preventive action decision support, in accordance with implementations of the present disclosure, as described herein. In the example of FIG. 5, the prognosis system 516 includes a health state prediction engine (e.g., the ITSAE 410 of FIG. 4), which is able to generate proactive action decisions.

In some examples, the IAD system 514 relays at least a portion of the data to the diagnosis system 518. In some examples, the diagnosis system 518 processes the data to detect anomalies and provides corrective action or recommendation, in accordance with implementations of the present disclosure, as described herein. The diagnosis system 518 includes fault classification (similar to the RCA module 212 of FIG. 2) that is able to alert asset managers of likely faults and the reason for fault. The diagnosis system 518 also includes advanced process control that uses RL to minimize set point deviation in automated process control scenarios.

In some implementations, the preventative action decision of the prognosis system 516 and the fault classification of the diagnosis system 518 enable RCA and decision-making support functionality of the actions system 520 by providing users with information on expected process degradation, among other available information. In some examples, the RCA includes Failure Mode & Effects Analysis (FMEA) as input to the ML-based models to classify and provide top rankings of tools/parts/processes that might be causing anomalies. In some examples, a confusion matrix is used to provide a feedback mechanism to a tool module expert to adjust the false positive and false negative results. In some examples, a Design of Experience (DoE) method is applied for sensitive analysis to show the cross-correlation influencers of the defect information.

Figure 6:
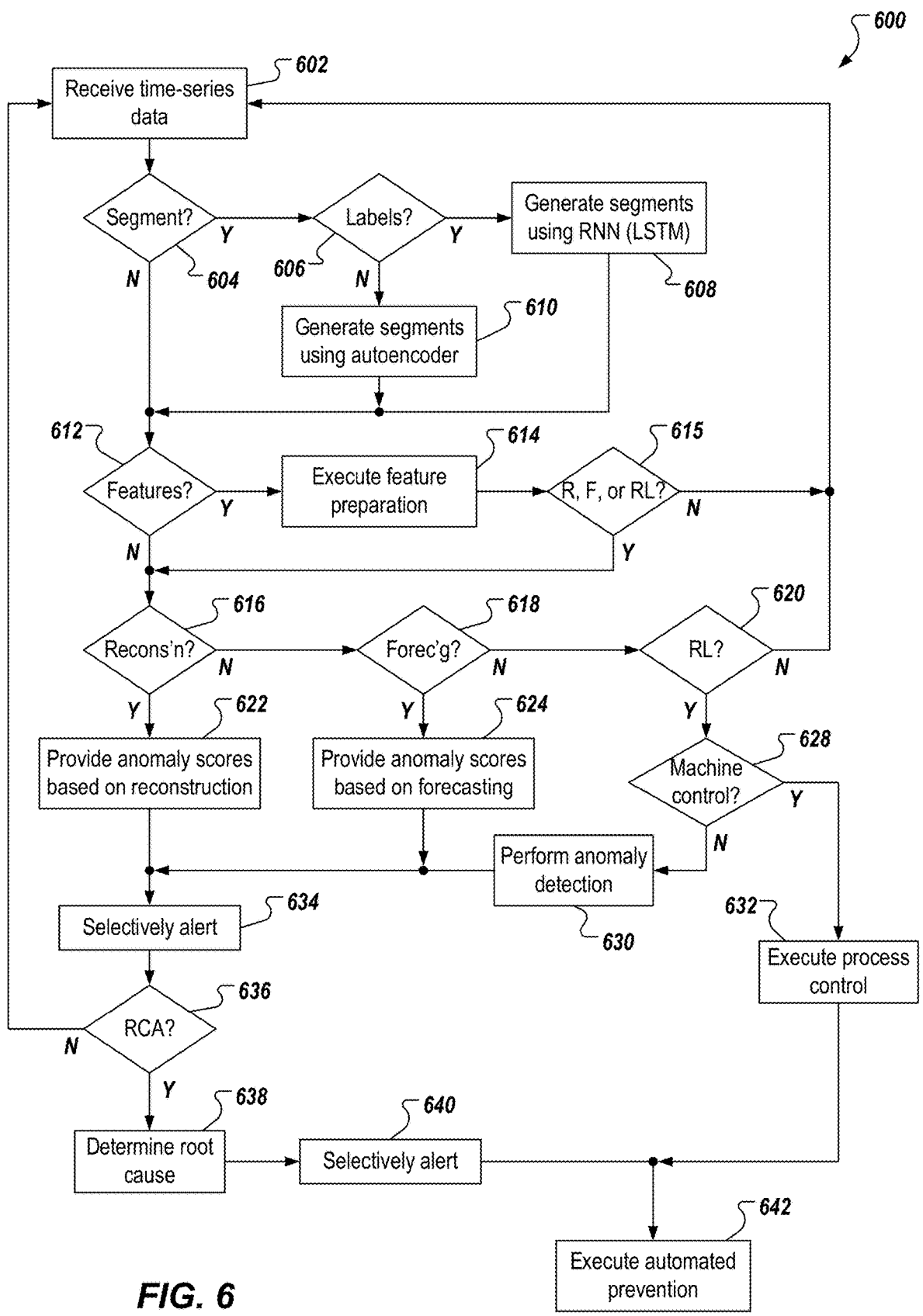
FIG. 6 depicts an example process that can be executed in implementations of the present disclosure.

FIG. 6 depicts an example process 600 that can be executed in implementations of the present disclosure. In some examples, the example process 600 is provided using one or more computer-executable programs executed by one or more computing devices (e.g., the back-end system 106 of FIG. 1). In some examples, the example process 600 can be executed to generate data models for time series data in accordance with implementations of the present disclosure. In some examples, the example process 600 can be executed by a computing system (e.g., the computing system 402 of FIG. 4) based on data provided from an on-premise system (e.g., the on-premise system 404 including data provided from IoT devices 444.

Time-series data is received (602). For example, the IoT devices 444 generate time-series data that is received by the computing system 402. It is determined whether segmentation of the time-series data is to be performed (604). In some examples, a setting can be provided, which indicates whether segmentation of the time-series data is to be performed. If segmentation of the time-series data is to be performed, it is determined whether training data including labels is available (606). If training data including labels is available, sequence segments are generated using a supervised learning approach (e.g., using RNN with LSTM) (608), as described herein. If training data including labels is not available, sequence segments are generated using an unsupervised learning approach (e.g., using an autoencoder) (610), as described herein. In some examples, segmentation outputs are grouped by classification label and/or similarity scores. If no time-series segmentation is performed, the original time-series data passes through. It is determined whether automated feature preparation is to be performed (612). In some examples, a setting can be provided, which indicates whether segmentation of the time-series data is to be performed. If automated feature preparation is to be performed, the time-series data or segments are transformed accordingly and output as a transformed data set (614). It is whether any of reconstruction, forecasting, and RL are to be considered (615). If not, the example process 600 loops back.

It is determined whether any of reconstruction (616), forecasting (618), and RL (620) is to be performed. If reconstruction is to be performed, one or more anomaly scores are provided based on reconstruction (622). In some examples, the anomaly scores are provided using an autoencoder or a GAN, as described in detail herein (e.g., with reference to FIG. 3D). If forecasting is to be performed, one or more anomaly scores are provided based on forecasting (624). In some examples, the anomaly scores are provided using a RNN (LSTM), as described in detail herein (e.g., with reference to FIG. 3D). In some examples, the anomaly scores are based on differential distance threshold between estimated and actual (e.g., for forecasting), as well as difference z-scoring threshold (e.g., for reconstruction). If RL is to be performed, it is determined whether automated machine control (process control) is to be performed (628). If machine control is not to be performed, anomaly detection is executed (630). If machine control is to be performed, process control is executed (632). For example, and as described herein, deep neural networks are used to model behavior which minimizes process deviation from a normal behavior set point. In some examples, the model determines the best combination of input process tuning and automatically controls input levels to produce a target process, which tracks closely with normal behavior or desired set point. This mode emulates the behavior of a standard controller.

One or more alerts are selectively issued (634). For example, in the case that action is human user alert, the best use of contacts and resources to get attention to the anomalous behavior quickly can be determined. This can include, for example, choosing forms of communication medium (e.g., email, text, pop-up, flashing lights), choosing contacts based on skill set and proximity (e.g., location on factory floor), and the like. Manual prevention using human alerting can be performed as soon as anomalous behavior is observed.

It can be determined whether RCA is to be performed (636). In some examples, RCA is performed, if sufficient input metadata is available to be actionable. If RCA is not to be performed, the example process 600 loops back. If RCA is to be performed, one or more root causes are determined (638). In some examples, RCA can be approached with classification (pattern matching), with lagged correlations, and/or with action tracking from a RL model, as described herein with reference to FIG. 3E. Identification of root causes can help enable automated prevention procedures (642) by better understanding what is causing the target process to behave undesirably. Once root causes are determined, additional alerts can be sent to users (640).

Although not depicted in FIG. 6, implementations of the example process 600 can account for cold-starts. A cold-start can be described as a situation, in which insufficient data is available to accurately model a system. In some implementations, cold-start can be addressed through data augmentation utilizing a GAN. In some examples, the GAN is used to simulate time series segments when no or little data exists for the target process. In some implementations, cold-start can be addressed using a model framework, such as DeepAR, to represent global behaviors for similar processes. This can be used in situations where historical time-series data exists for processes that are similar to but not the same as the target process (e.g., temperature probe data from wafer fabrication tool A where target process is on wafer fabrication tool B).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple (CPU and/or GPU) processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for automated machine learning in industrial process control, the method being executed by one or more processors and comprising:
   receiving, by the one or more processors, two or more time-series data sequences representative of a target process executed within a physical environment;
   executing, by the one or more processors, automated time-series process segmentation to provide a plurality of subsequence segments for each of the two or more time-series data sequences, each subsequence segment corresponding to a phase of the target process, wherein the target process comprises a plurality of phases, and wherein each phase of the target process corresponds to a different time-series model,
      wherein executing the automated time-series process segmentation comprises: executing a deep learning model to process each time-series data sequence into an encoded vector, wherein the encoded vector includes a first encoded vector generated by an autoencoder concatenated with a variable transformation of the time-series data sequence generated by an additive and multiplicative effects network (AME);
   processing, by the one or more processors, the plurality of subsequence segments using at least one time-series transformation to provide a feature data set for each subsequence segment;
   applying, by the one or more processors, each feature data set of each subsequence segment to provide a plurality of time-series models for anomaly detection and forecasting, respectively, each time-series model i) corresponding to a phase of the target process, and ii) being provided as one of a recurrent neural network (RNN), a convolution neural network (CNN), and a generative adversarial network (GAN);
   determining, by the one or more processors, anomaly scores based on the plurality of time-series models; and
   selectively providing, by the one or more processors, an alert to one or more users, each alert indicating at least one anomaly and a respective probability.

2. The method of claim 1, wherein executing automated time-series process segmentation comprises processing each of the two or more time-series data sequences using a deep learning (DL) model provided as one of a bidirectional long short-term memory (LSTM) sequence classifier using supervised learning, and the autoencoder using unsupervised learning.

3. The method of claim 1, wherein the at least one time-series transformation comprises one or more of a temporal transformation, a spectral transformation, a shape transformation, a statistical transformation, an autoencoder transformation, and a decomposition transformation, and a pass-through transformation.

4. The method of claim 1, further comprising processing each feature data set through a reinforcement learning framework, in which rewards are applied based on minimal time deviation from a process set point within the target process.

5. The method of claim 4, further comprising automatically adjusting a controller based on reinforcement learning to reduce deviation from the process set point.

6. The method of claim 1, further comprising executing root cause analysis to determine a cause of an anomaly using one or more of classification, correlation, and RL-based action tracking for fault cause inference.

7. The method of claim 6, wherein the alert comprises a cause determined for the at least one anomaly.

8. The method of claim 1, wherein the two or more time-series data sequences are generated by one or more Internet-of-Things (IoT) devices located within the physical environment.

9. A non-transitory computer-readable storage medium coupled to one or more processors and having instructions stored thereon which, when executed by the one or more processors, cause the one or more processors to perform operations for automated machine learning in industrial process control, the operations comprising:
   receiving two or more time-series data sequences representative of a target process executed within a physical environment;
   executing automated time-series process segmentation to provide a plurality of subsequence segments for each of the two or more time-series data sequences, each subsequence segment corresponding to a phase of the target process, wherein the target process comprises a plurality of phases, and wherein each phase of the target process corresponds to a different time-series model,
      wherein executing the automated time-series process segmentation comprises: executing a deep learning model to process each time-series data sequence into an encoded vector, wherein the encoded vector includes a first encoded vector generated by an autoencoder concatenated with a variable transformation of the time-series data sequence generated by an additive and multiplicative effects network (AME);
   processing the plurality of subsequence segments using at least one time-series transformation to provide a feature data set for each subsequence segment;
   applying each feature data set of each subsequence segment to provide a plurality of time-series models for anomaly detection and forecasting, respectively, each time-series model i) corresponding to a phase of the target process, and ii) being provided as one of a recurrent neural network (RNN), a convolution neural network (CNN), and a generative adversarial network (GAN);
   determining anomaly scores based on the plurality of time-series models; and
   selectively providing an alert to one or more users, each alert indicating at least one anomaly and a respective probability.

10. The computer-readable storage medium of claim 9, wherein executing automated time-series process segmentation comprises processing each of the two or more time-series data sequences using a deep learning (DL) model provided as one of a bidirectional long short-term memory (LSTM) sequence classifier using supervised learning, and the autoencoder using unsupervised learning.

11. The computer-readable storage medium of claim 9, wherein the at least one time-series transformation comprises one or more of a temporal transformation, a spectral transformation, a shape transformation, a statistical transformation, an autoencoder transformation, and a decomposition transformation, and a pass-through transformation.

12. The computer-readable storage medium of claim 9, wherein operations further comprise processing each feature data set through a reinforcement learning framework, in which rewards are applied based on minimal time deviation from a process set point within the target process.

13. The computer-readable storage medium of claim 12, wherein operations further comprise automatically adjusting a controller based on reinforcement learning to reduce deviation from the process set point.

14. The computer-readable storage medium of claim 9, wherein operations further comprise executing root cause analysis to determine a cause of an anomaly using one or more of classification, correlation, and RL-based action tracking for fault cause inference.

15. The computer-readable storage medium of claim 14, wherein the alert comprises a cause determined for the at least one anomaly.

16. The computer-readable storage medium of claim 9, wherein the two or more time-series data sequences are generated by one or more Internet-of-Things (IoT) devices located within the physical environment.

17. A system, comprising:
   one or more processors; and
   a computer-readable storage device coupled to the one or more processors and having instructions stored thereon which, when executed by the one or more processors, cause the one or more processors to perform operations for automated machine learning in industrial process control, the operations comprising:
      receiving two or more time-series data sequences representative of a target process executed within a physical environment;
      executing automated time-series process segmentation to provide a plurality of subsequence segments for each of the two or more time-series data sequences, each subsequence segment corresponding to a phase of the target process, wherein the target process comprises a plurality of phases, and wherein each phase of the target process corresponds to a different time-series model,
         wherein executing the automated time-series process segmentation comprises:
      executing a deep learning model to process each time-series data sequence into an encoded vector, wherein the encoded vector includes a first encoded vector generated by an autoencoder concatenated with a variable transformation of the time-series data sequence generated by an additive and multiplicative effects network (AME);
      processing the plurality of subsequence segments using at least one time-series transformation to provide a feature data set for each subsequence segment;
      applying each feature data set of each subsequence segment to provide a plurality of time-series models for anomaly detection and forecasting, respectively, each time-series model i) corresponding to a phase of the target process, and ii) being provided as one of a recurrent neural network (RNN), a convolution neural network (CNN), and a generative adversarial network (GAN);
      determining anomaly scores based on the plurality of time-series models; and
      selectively providing an alert to one or more users, each alert indicating at least one anomaly and a respective probability.

18. The system of claim 17, wherein executing automated time-series process segmentation comprises processing each of the two or more time-series data sequences using a deep learning (DL) model provided as one of a bidirectional long short-term memory (LSTM) sequence classifier using supervised learning, and the autoencoder using unsupervised learning.

19. The system of claim 17, wherein the at least one time-series transformation comprises one or more of a temporal transformation, a spectral transformation, a shape transformation, a statistical transformation, an autoencoder transformation, and a decomposition transformation, and a pass-through transformation.

20. The system of claim 17, wherein operations further comprise processing each feature data set through a reinforcement learning framework, in which rewards are applied based on minimal time deviation from a process set point within the target process.

21. The system of claim 20, wherein operations further comprise automatically adjusting a controller based on reinforcement learning to reduce deviation from the process set point.

22. The system of claim 17, wherein operations further comprise executing root cause analysis to determine a cause of an anomaly using one or more of classification, correlation, and RL-based action tracking for fault cause inference.

23. The system of claim 22, wherein the alert comprises a cause determined for the at least one anomaly.

24. The system of claim 17, wherein the two or more time-series data sequences are generated by one or more Internet-of-Things (IoT) devices located within the physical environment.

* * * * *